No. 844,174. PATENTED FEB. 12, 1907.
H. L. McDUFFEE.
WAVE MOTOR.
APPLICATION FILED AUG. 22, 1906.
2 SHEETS—SHEET 1.
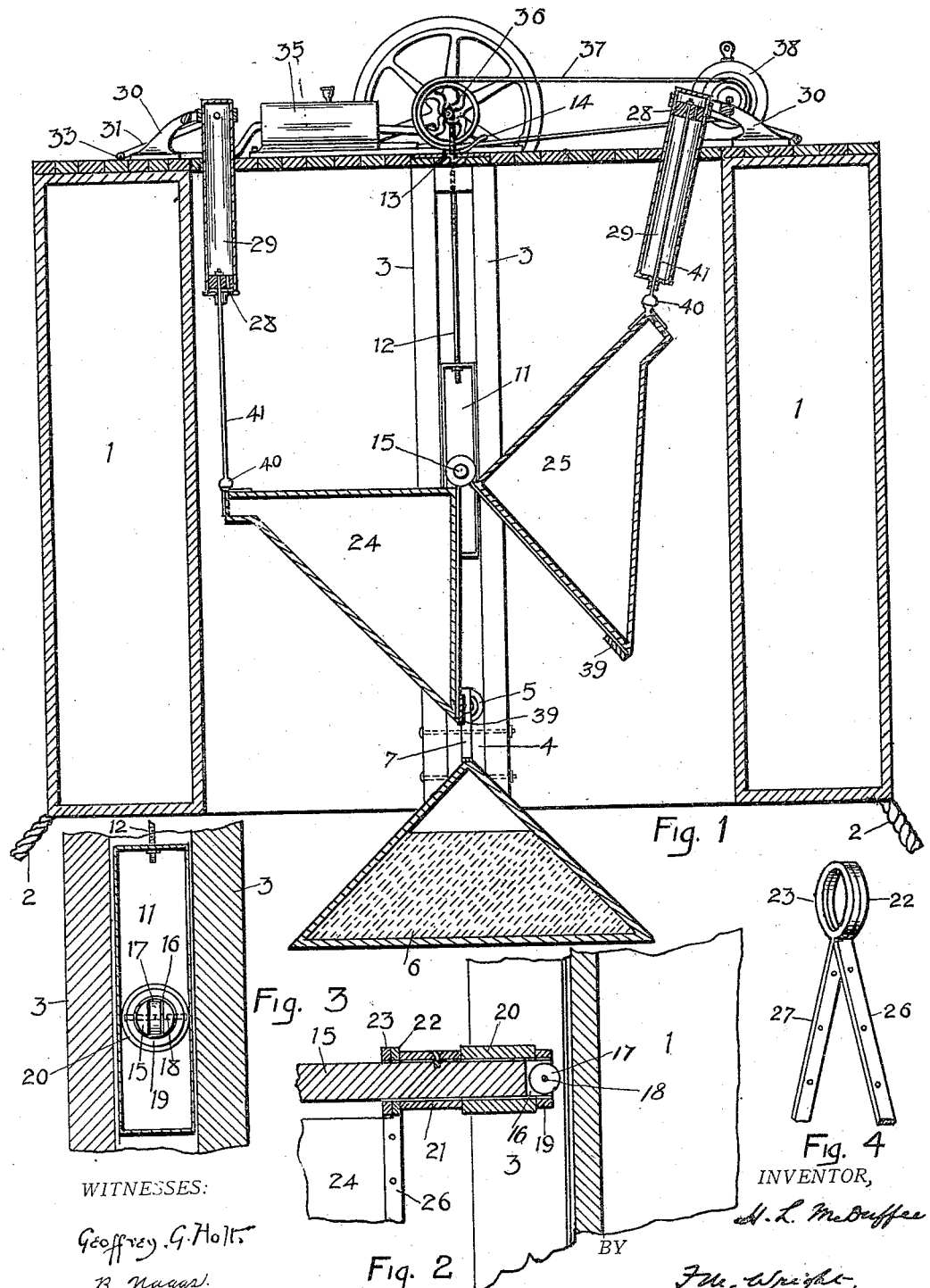
WITNESSES:
Geoffrey G. Holt
B. Naggs
INVENTOR,
H. L. McDuffee
BY
F. M. Wright
ATTORNEY.

No. 844,174. PATENTED FEB. 12, 1907.
H. L. McDUFFEE.
WAVE MOTOR.
APPLICATION FILED AUG. 22, 1906.
2 SHEETS—SHEET 2.
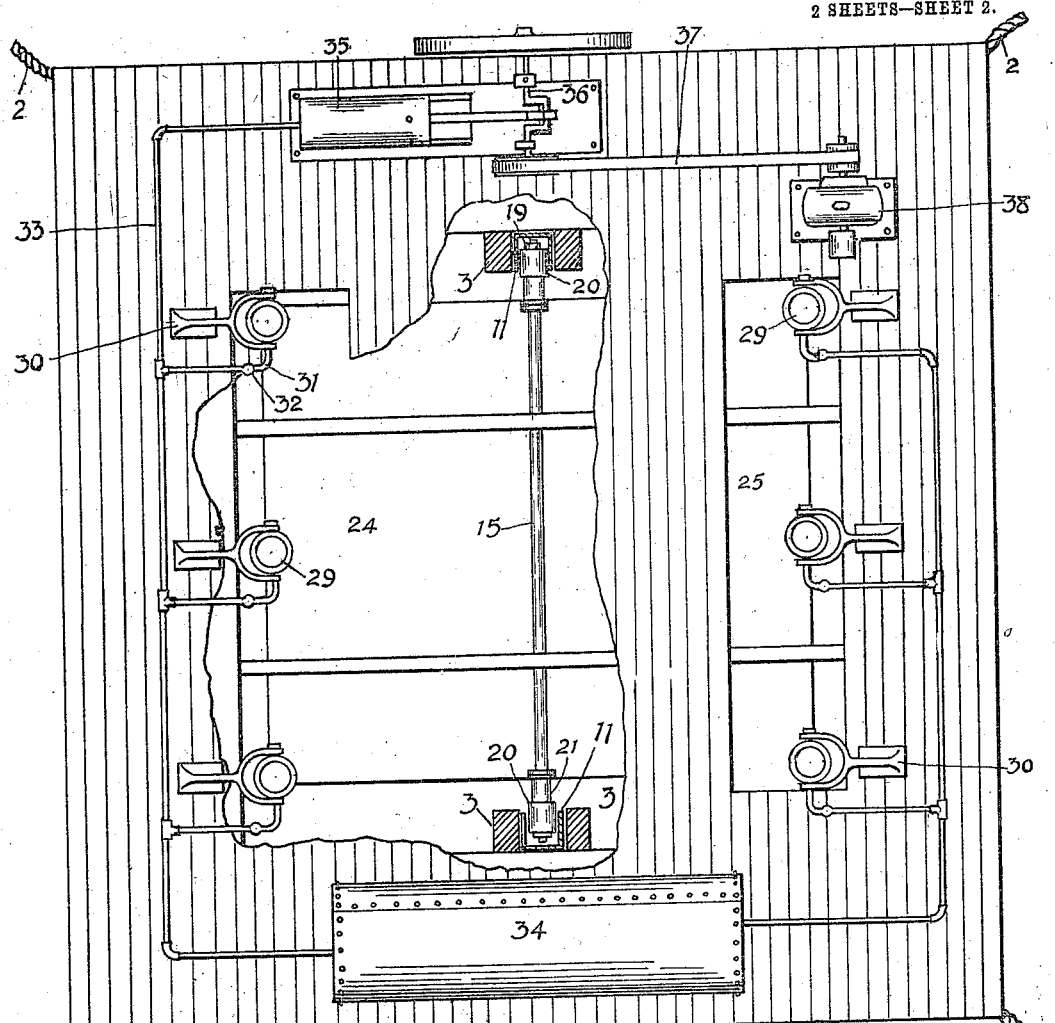
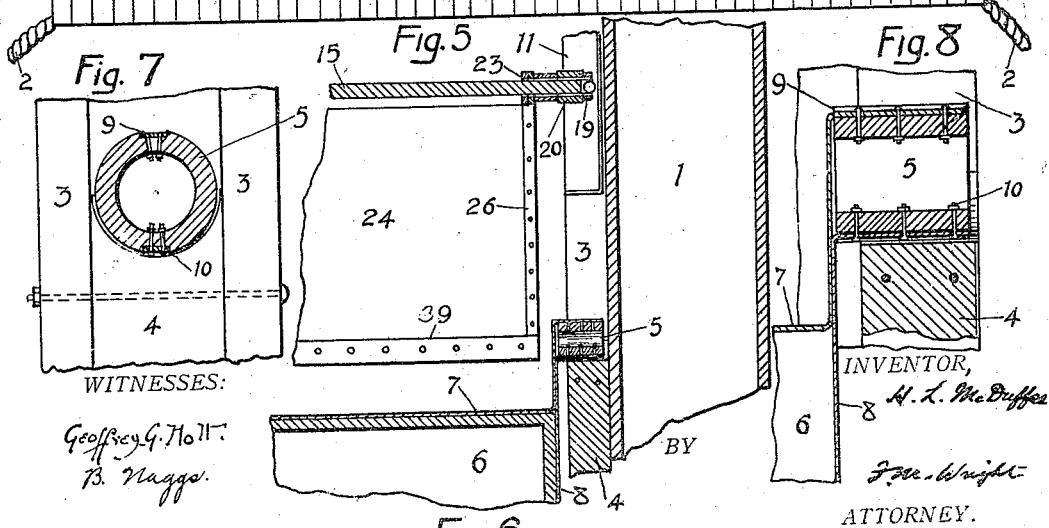
WITNESSES:
Geoffrey G. Holt
B. Naggs
INVENTOR,
H. L. McDuffee
BY
F. M. Wright
ATTORNEY.

UNITED STATES PATENT OFFICE.

HENRY L. McDUFFEE, OF GILROY, CALIFORNIA.

WAVE-MOTOR.

No. 844,174.	Specification of Letters Patent.	Patented Feb. 12, 1907.

Application filed August 22, 1906. Serial No. 331,609.

*To all whom it may concern:*

Be it known that I, HENRY L. McDUFFEE, a citizen of the United States, residing at Gilroy, in the county of Santa Clara and State of California, have invented new and useful Improvements in Wave-Motors, of which the following is a specification.

This invention relates to improvements in wave-motors, the object of the invention being to provide a wave-motor which will be very effective in proportion to its size in transmitting the force of the waves and will avoid the use of piling and other expensive works.

In the accompanying drawing, Figure 1 is a vertical section of the apparatus. Fig. 2 is an enlarged vertical section of the end of the shaft. Fig. 3 is an end view of the same. Fig. 4 is a perspective view of the hangers. Fig. 5 is a broken plan view of the apparatus. Fig. 6 is a broken vertical section of the same at right angles to Fig. 1. Fig. 7 is an enlarged cross-section of the roller. Fig. 8 is an enlarged longitudinal section of the same.

Referring to the drawings, 1 represents the outer float, which supports the entire apparatus. Said float is preferably rectangular in form, made of hollow walls made water-tight, and is secured in the desired position by cables 2 and anchors. (Not shown.) Attached to the inner side of opposite walls of said outer float are vertical boxes 3, the lower ends of which have secured therein half-round bearings 4 to receive hollow rollers 5, from which is suspended a heavily-weighted deflector 6, triangular in cross-section. This deflector is secured to each roller by means of bars 7 8, connected, respectively, to the top and the corresponding end of the deflector, and extending upward therefrom, and then bent out at right angles to enter recesses 9 in the circumference of the roller and bolted to said roller by bolts 10. By this means the ends of the deflector are firmly secured to the rollers, which rollers roll in the half-round bearings in the main boxes 3.

Each main box constitutes a guideway for an inner box 11, rectangular in form and adjustably supported by a rod 12, which extends through the top of the main box and is threaded at its upper end, carrying on said threaded end a nut 13 with a handle 14, so by turning said nut the rod and the box can be raised or lowered, as desired, for adjustment. These boxes 11 serve as guideways for the ends of a transverse shaft 15, carrying the working floats. Each end of the shaft is slotted or forked, as shown at 16, and in said slot is contained a roller 17, a pin 18 being passed centrally through said roller and through the sides of the fork. Said pin 18 also passes diametrically through a collar 19, encircling said forked end. Said collar thus shields the end of the shaft, and particularly the roller, as it moves up and down in the box 11. Next to the fixed collar 19 on on each end of the shaft is a sleeve 20, which can revolve upon the shaft, being held in position by a collar 21, fixedly secured on said shaft, the sleeve 20 contacting with the sides of the box 11 as the end of the shaft moves up and down. Next to each fixed collar 21 are arranged loose upon the shaft a pair of hangers 22 23 for the twin working floats 24 25. Said hangers comprise sleeves surrounding the shaft side by side and depending arms 26 27, each extending beneath the sleeve of the other hanger. The arms 26 27 of these hangers are secured to the inner sides of the twin floats at their ends. The fixed collars 21 are made sufficiently long to serve as spacing-washers, maintaining the ends of the twin floats out of possible contact with the vertical boxes 3 and 11, notwithstanding the tilting of the shaft due to the motion of the waves.

Each twin float is in cross-section approximately an isosceles right-angled triangle, the equal sides being in the position of rest, vertical and horizontal. The outer edge of the horizontal side of each float is attached by ball-and-socket joints 40 to piston-rods 41 of pistons 28, which reciprocate in the cylinders 29 of air-compressors pivoted on trunnions 30, through one of which trunnions the compressed air passes by a pipe 31, having therein a check-valve 32, to a common pipe 33, leading to a compressed-air reservoir 34 and also to a compressed-air engine 35, operating a shaft 36 from a pulley 37, on which power is transmitted to an electric dynamo 38, generating electricity.

The working floats 24 25 are suitably weighted at their lower edges, preferably by iron bars 39, secured to their inner sides.

The operation of the apparatus is as follows: The deflector being heavily weighted offers great resistance to the momentum of the waves, so that a wave striking it on either side is deflected and impinges upon the lower oblique face of the corresponding working float. It thereby raises said float and passes under the edge thereof and impinges against the inner vertical side of the other twin float, thus lifting both floats, and correspondingly operates the pumps. As the wave passes on, said floats drop in the same order, the weights at the bottom of the floats brings them down to their original position, ready for the impact of another wave. A wave coming from the opposite side will act in precisely the same manner, impinging against the other sloping surface of the deflector, being deflected thereby and raising both the twin floats in turn.

It will be understood from the foregoing that all of the various movements of the working floats will result in compression of the air in the compressors 29. These movements are, first, swinging of the working floats on the shaft; second, rise and fall of one end of the shaft relative to the other end; third, rise and fall of the shaft and the working floats bodily. Thus the apparatus works most effectively in transmitting the force of the waves.

The apparatus comprising the air-compressors, the compressed-air engines, and the dynamos for utilizing the force obtained from the waves is herein disclosed only as one among many forms of apparatus which might be used for this purpose and forms no part of my present invention.

The outer float not only acts as a support for the whole of the working apparatus, but is so constructed as to withstand storms and protect the working parts from the effect of such storms without materially interfering with the action of the waves thereon.

An important feature of the apparatus is the arrangement whereby the working floats are connected directly with the air pumps or compressors, so as to avoid the loss of power occasioned by the interposition of racks and other mechanism heretofore used. It will be readily seen that instead of using the air-compressors water-pumps may also be directly connected with the working floats to pump water, if desired.

I claim—

1. In a wave-motor, an outer supporting-float, an inner working float, a deflector below said working float to deflect the waves thereagainst, and means carried by the first float and connected with the second float for transmitting the power obtained from the latter, substantially as described.

2. In a wave-motor, an outer supporting-float, an inner working float, a deflector below said working float to deflect the waves thereagainst, rollers for suspending the deflectors, and means carried by the first float and connected with the second float for transmitting the power obtained from the latter, substantially as described.

3. In a wave-motor, an outer supporting-float, an inner working float, comprising twin floats and a common shaft upon which they swing independently, and means carried by the first float and connected with the second float for transmitting the power obtained from the latter, substantially as described.

In testimony whereof I have hereunto set my hand in the presence of two subscribing witnesses.

HENRY L. McDUFFEE.

Witnesses:
J. N. POE,
F. W. BLAKE.